(12) United States Patent
Bucur et al.

(10) Patent No.: US 6,756,769 B2
(45) Date of Patent: Jun. 29, 2004

(54) ENABLING CIRCUIT FOR AVOIDING NEGATIVE VOLTAGE TRANSIENTS

(75) Inventors: Constantin Bucur, Santa Clara, CA (US); Marian Niculae, San Jose, CA (US)

(73) Assignee: O2Micro International Limited, Cayman Islands (KN)

( * ) Notice: Subject to any disclaimer, the term of this patent is extended or adjusted under 35 U.S.C. 154(b) by 36 days.

(21) Appl. No.: 10/176,141

(22) Filed: Jun. 20, 2002

(65) Prior Publication Data

US 2003/0234633 A1 Dec. 25, 2003

(51) Int. Cl.[7] .............................................. H01M 10/46
(52) U.S. Cl. ....................................... 320/134; 320/166
(58) Field of Search ................................. 320/134, 166, 320/132

(56) References Cited

U.S. PATENT DOCUMENTS

| | | | |
|---|---|---|---|
| 4,476,425 A | 10/1984 | Chernotsky et al. | 320/39 |
| 4,535,399 A | 8/1985 | Szepesi | 363/20 |
| 4,541,041 A | 9/1985 | Park et al. | 363/41 |
| 4,586,119 A | 4/1986 | Sutton | 363/17 |
| 4,621,313 A | 11/1986 | Kiteley | 363/49 |
| 4,672,258 A | 6/1987 | Park et al. | 363/98 |
| 4,727,469 A | 2/1988 | Kammiller | 363/56 |
| 4,748,550 A | 5/1988 | Okado | 363/98 |
| 4,794,506 A | 12/1988 | Hino et al. | 363/17 |
| 4,814,962 A | 3/1989 | Magalhaes et al. | 363/16 |
| 4,833,584 A | 5/1989 | Divan | 363/37 |
| 4,849,682 A | 7/1989 | Bauer et al. | 320/15 |
| 4,855,888 A | 8/1989 | Henze et al. | 363/132 |
| 4,860,189 A | 8/1989 | Hitchcock | 363/132 |
| 4,864,483 A | 9/1989 | Divan | 363/37 |
| 4,912,622 A | 3/1990 | Steigerwald et al. | 363/98 |
| 4,935,857 A | 6/1990 | Nguyen et al. | 363/17 |

(List continued on next page.)

OTHER PUBLICATIONS

"An Introduction to the Principles and Features of Resonant Power Conversion", Steve Freeland, form *Recent Developments in Resonant Power Conversion*, Intertec Communications, Inc., 1988, pp. 20–43.

"Zero–Voltage Switching Technique in DC/DC Coverters", Kwang–Hwo Liu and Fred C. Lee, from *Recent Developments in Resonant Power Conversion*, Intertec Communications, Inc., 1988, pp. 211–223.

"A New and Imporved Control Technique Greatly Simplifies the Design of ZVS Resonant Inverters and DC/DC Power Supplies", Mehmet K. Nalbant, 1995 IEEE, pp. 649–701.

*Switching Power Supply Design*, Abraham I. Pressman, McGraw–Hill, 1991, pp. 93–104; 471–492.

"Phase Shifted Zero Voltage Transition Design Considerations and the UC3875 PWM Controller", by Bill Andreycak, Unitrode, Application Note, May 1997, pp. 1–14.

"Fixed–Frequency, Resonant–Switched Pulse Width Modulation with Phase–Shifted Control", by Bob Mammano and Jeff Putsch, from *Power Supply Design Seminar*, Unitrode, 1991, pp. 5–1 to 5–7.

(List continued on next page.)

*Primary Examiner*—Bao Q. Vu
(74) *Attorney, Agent, or Firm*—Grossman Tucker Perreault & Pfleger, PLLC

(57) ABSTRACT

An enabling circuit includes a comparison circuit configured to compare a feedback signal representative of a charge of an energy storage element of a regulating circuit with a reference charge and provide an output in response to the comparison to enable the regulating circuit to switch from a first state to a second state if the charge of the energy storage element is less than the reference charge. The enabling circuit may also be used to enable a synchronous rectifier converter to provide a charging current to a battery in a battery charging system of an electronic device thereby avoiding negative voltage transients that may otherwise occur at the output of the synchronous rectifier converter. Various methods are also provided.

32 Claims, 2 Drawing Sheets

U.S. PATENT DOCUMENTS

| | | | |
|---|---|---|---|
| 4,952,849 A | 8/1990 | Fellows et al. | 315/307 |
| 4,953,068 A | 8/1990 | Henze | 363/17 |
| 4,992,919 A | 2/1991 | Lee et al. | 363/17 |
| 5,017,800 A | 5/1991 | Divan | 307/66 |
| 5,019,996 A | 5/1991 | Lee | 364/483 |
| 5,027,263 A | 6/1991 | Harada et al. | 363/16 |
| 5,027,264 A | 6/1991 | DeDoncker et al. | 363/16 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,268,830 A | 12/1993 | Loftus, Jr. | 363/17 |
| 5,285,372 A | 2/1994 | Huynh et al. | 363/132 |
| 5,291,382 A | 3/1994 | Cohen | 363/16 |
| 5,305,191 A | 4/1994 | Loftus, Jr. | 363/17 |
| 5,355,073 A | 10/1994 | Nguyen | 320/15 |
| 5,363,020 A | 11/1994 | Chen et al. | 315/209 R |
| 5,384,516 A | 1/1995 | Kawabata et al. | 315/160 |
| 5,402,329 A | 3/1995 | Wittenbreder, Jr. | 363/16 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,448,155 A | 9/1995 | Jutras | 323/285 |
| 5,448,467 A | 9/1995 | Ferreira | 363/17 |
| 5,481,160 A | 1/1996 | Nilssen | 315/209 R |
| 5,510,974 A | 4/1996 | Gu et al. | 363/134 |
| 5,514,921 A | 5/1996 | Hankui et al. | 307/125 |
| 5,546,300 A | 8/1996 | Lee et al. | 363/132 |
| 5,559,688 A | 9/1996 | Pringle | 363/89 |
| 5,615,093 A | 3/1997 | Nalbant | 363/25 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,669,238 A | 9/1997 | Devers | 62/657 |
| 5,684,683 A | 11/1997 | Divan et al. | 33/65 |
| 5,694,007 A | 12/1997 | Chen | 315/247 |
| 5,712,533 A | 1/1998 | Corti | 315/169.3 |
| 5,715,155 A | 2/1998 | Shahani et al. | 363/132 |
| 5,719,474 A | 2/1998 | Vitello | 315/307 |
| 5,723,970 A * | 3/1998 | Bell | 320/140 |
| 5,731,652 A | 3/1998 | Shimada | 310/316 |
| 5,734,261 A | 3/1998 | Knudsen | 323/908 |
| 5,736,842 A | 4/1998 | Jovanovic | 323/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 R |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Nowak et al. | 363/37 |
| 5,818,172 A | 10/1998 | Lee | 315/86 |
| 5,834,889 A | 11/1998 | Ge | 313/493 |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 PZ |
| 5,886,884 A | 3/1999 | Baek et al. | 363/48 |
| 5,894,412 A | 4/1999 | Faulk | 363/56 |
| 5,910,709 A | 6/1999 | Stevanovic et al. | 315/225 |
| 5,917,722 A | 6/1999 | Singh | 363/132 |
| 5,920,475 A | 7/1999 | Boylan et al. | 363/127 |
| 5,923,129 A | 7/1999 | Henry | 315/307 |
| 5,930,121 A | 7/1999 | Henry | 363/16 |
| 5,932,976 A | 8/1999 | Maheshwari et al. | 315/291 |
| 5,939,830 A | 8/1999 | Praiswater | 315/DIG. 4 |
| 5,946,200 A | 8/1999 | Kim et al. | 363/17 |
| 5,998,974 A | 12/1999 | Sudo et al. | 320/136 |
| 6,011,360 A | 1/2000 | Gradzki et al. | 315/244 |
| 6,114,814 A | 9/2000 | Shannon et al. | 315/219 |
| 6,127,815 A * | 10/2000 | Wilcox | 323/282 |
| 6,184,660 B1 * | 2/2001 | Hatular | 320/141 |
| 6,316,881 B1 | 11/2001 | Shannon et al. | 315/219 |
| 6,330,169 B2 * | 12/2001 | Mullett et al. | 363/16 |
| 6,366,066 B1 * | 4/2002 | Wilcox | 323/282 |
| 6,396,722 B2 | 5/2002 | Lin | 363/98 |
| 6,459,595 B2 * | 10/2002 | Assow | 363/21.14 |
| 6,580,258 B2 * | 6/2003 | Wilcox et al. | 323/282 |

OTHER PUBLICATIONS

"Zero Voltage Switching Resonant Power Conversion", by Bill Andreycak, from *Power Supply Design Seminar*, Unitrode, 1991, pp. A2–1 to A2–24; and A2–1A to A2–3A.

"Resonant Made Converter Topologies", by Bob Mammano, form *Power Supply Design Seminar*, Unitrode, 1991, pp. P3–1 to P3–12.

"The New UC3879 Phase–Shifted PWM Controller Simplifies the Design of Zero Voltage Transition Full–Bridge Converters", by Laszio Balogh, Unitrode, Application Note, 1995, pp. 1–8.

"A Comparative Study of a Class of Full Bridge Zero–Voltage–Switched PWM Converters", by W. Chen et al., 1995 IEEE, pp. 893–899.

"Optimum ZVS Full–Bridge DC/DC Converter with PWM Phase–Shift Control: Analysis, Design Considerations, and Experimental Results"; by Richard Red I et al., 1994 IEEE, pp. 156–165.

"A Frequency/PWM Controlled Converter with Two Independently Regulated Outputs", by R.A. Fisher et al., HFPC, May 1989, pp. 459–471.

"Feasible Characteristic Evaluations of Resonant Tank PWM Inverter–Linked DC–DC High–Power Converters for Medical–Use High–Voltage Application", by H. Takano et al., 1995 IEEE, pp. 913–919.

"High Density Power–Hybrid Design of a Half–Bridge Multi–Resonant Converter", by Richard Farrington, et al., HFPC–Virginia Polytechnic Institute, May 1990, pp. 26–33.

"Small–Signal Analysis of the Zero–Voltage Switched Full–Bridge PWM Converter", by V. Vlatkovic et al., HFPC–virginia Polytechnic Institute, May 1990, pp. 262–272.

* cited by examiner

ENABLING CIRCUIT FOR AVOIDING NEGATIVE VOLTAGE TRANSIENTS

FIELD OF THE INVENTION

This invention relates to an enabling circuit for avoiding negative voltage transients from an associated regulating circuit, and more particularly to such an enabling circuit for enabling a synchronous rectifier converter to switch from a first state to second state if the charge on an energy storage element of the synchronous rectifier converter is less than a reference charge.

BACKGROUND OF THE INVENTION

A variety of circuits have energy storage element such as capacitors, inductors, and transformers that transfer energy from an input to an output of such circuits. If such energy storage elements are not properly discharged in some instances, unwanted power disturbances, e.g., negative voltage transients, may occur in the output signal causing damage to nearby sensitive components.

For instance, such a regulating circuit may be a DC-DC converter. DC-DC converters generally accept a DC input at one voltage level and convert it to a DC output at a higher or lower voltage level. Such DC-DC converters may be used in a wide variety of electronic devices in conjunction with a variety of systems. One such system may be used to provide a battery charging function for portable electronic devices such as laptop computers, cell phones, pagers, personal digital assistants, and the like.

One type of DC-DC converter is a synchronous rectifier converter (SRC). An SRC does not use any Schottky diodes, but rather uses transistors referred to as "synchronous rectifiers." Such transistors may be a variety of transistors such as MOS or MOSFET transistors. An SRC may also have a variety of internal components that typically include an energy storage element, e.g., a capacitor, inductor, or transformer, with one or more transistors controlled by various control techniques, e.g., pulse width modulation where the switch frequency is constant and the duty cycle varies with the load.

When an SRC is used in conjunction with a battery power management system, the SRC may accept an input voltage from a number of different power sources and convert it to an appropriate output voltage to, among other things, provide an appropriate charging current to an associated rechargeable battery. In such a battery power management system, there is typically an associated controller used to control the battery charging process. Such controller may be an integrated circuit (IC) having a plurality of input terminals or pins, some of which are connected to the output of the SRC. For instance, two such terminals may be coupled to either side of a sense resistor. The sense resistor may be in series with the output of the SRC such that it provides a signal representative of the charging current provided at the output of the SRC.

If a soft start occurs when the energy storage element, e.g., a capacitor, of the SRC is charged at a significant value, e.g., over several volts, negative voltage transients may appear on either terminal of the sense resistor potentially causing catastrophic failure of the associated controller IC. Accordingly, there is a need for an enabling circuit and method that overcomes the above deficiencies in the prior art and is capable of avoiding negative voltage transients from an associated regulating circuit by enabling the regulating circuit only when the charge on the energy storage element is below a reference charge.

BRIEF SUMMARY OF THE INVENTION

An enabling circuit for enabling an associated regulating circuit having an energy storage element consistent with the invention includes: a comparison circuit configured to compare a feedback signal representative of a charge of the energy storage element with a signal representative of a reference charge and provide an output in response to the comparison; and an output decision circuit configured to receive at least the output from the comparison circuit and provide an enabling signal to enable the regulating circuit to switch from a first state to a second state if the charge of the energy storage element is less than the reference charge.

A battery charging system consistent with the invention includes: a rechargeable battery; a power source; a synchronous rectifier converter configured to accept an input power level from the power source and provide a regulated output power level to the battery, the synchronous rectifier converter having an energy storage element; and an enabling circuit for enabling the synchronous rectifier converter, the enabling circuit comprising: a comparison circuit configured to compare a feedback signal representative of a charge across the energy storage element with a signal representative of a reference charge and provide an output in response to the comparison; and an output decision circuit configured to receive at least the output from the comparison circuit and provide an enabling signal to enable the synchronous rectifier converter to switch from a first state to a second state if the charge of the energy storage element is less than the reference charge.

A method of avoiding negative voltage transients at the output of a regulating circuit having an energy storage element consistent with the invention includes the steps of: monitoring a charge on the energy storage element; maintaining the regulating circuit in a first state if the charge is above a reference level; and switching the regulating circuit to a second state if the charge is below the reference level.

A method of avoiding negative voltage transients at the output of a synchronous rectifier converter having a capacitor, wherein the synchronous rectifier converter provides a charging current to an associated rechargeable battery, wherein such a method consistent with the invention includes the steps of: monitoring a charge on the capacitor; maintaining the synchronous rectifier converter in a first state if the charge on the capacitor is above a reference charge; discharging the capacitor until the charge on the capacitor is less than the reference charge; and enabling the charging current to flow to the associated rechargeable battery once the capacitor is discharged to a charge value less than the reference charge.

Another enabling circuit for enabling an associated regulating circuit having an energy storage element consistent with the invention includes: a comparison circuit configured to compare a feedback signal representative of a charge of the energy storage element with a signal representative of a reference charge and provide an output in response to the comparison to enable the regulating circuit to switch from a first state to a second state if the charge of the energy storage element is less than the reference charge.

Another enabling circuit for enabling an associated regulating circuit having an energy storage element consistent with the invention includes: an output decision circuit configured to receive a signal representative of a comparison between a charge on the energy storage element and a reference charge level and provide an enabling signal to enable the regulating circuit to switch from a first state to a second state if the charge of the energy storage element is less than the reference charge.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
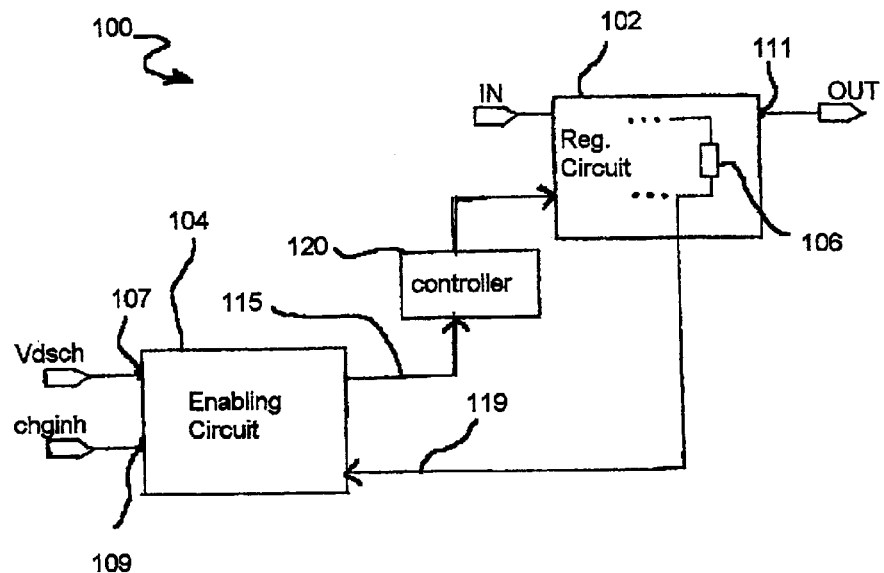
FIG. 1 is a block diagram of a system including an enabling circuit consistent with the present invention for enabling an associated regulating circuit to switch from a first state to a second state.

Turning to FIG. 1, an exemplary system 100 including an enabling circuit 104 and an associated regulating circuit 102 is illustrated. The regulating circuit 102 may be any variety of circuits, e.g., a synchronous rectifier converter, containing an energy storage element 106, e.g., a capacitor. In general, the enabling circuit 104 monitors the charge on the energy storage element 106 and enables the regulating circuit 102 to switch from a first state to a second state when the charge on the energy storage element is below a reference charge. The first state may be any variety of states such as a power off state, and the second state may also be any variety of states such as an operating state where the regulating circuit 102 is controlled by a particular control technique. The reference charge should be chosen based on the particular system and sensitivity of associated components. In one embodiment, the reference charge may be 3.0 volts.

The enabling circuit 104 has one input terminal 107 configured to accept a signal, Vdsch, representative of an acceptable reference charge level for the energy storage element 106. The enabling circuit 104 may have another input terminal 109 configured to accept a logic control signal chginh. Such logic control signal, chginh, has a predetermined state, e.g., low state, when at least one non energy storage element condition related to operation of the regulating circuit 102 is satisfied. Such a condition or conditions may be any variety of other conditions known to those skilled in the art unrelated to the charge on the energy storage element 106. For instance, one condition may be the proper coupling of an input power source at a proper power level to the input of the regulating circuit 102.

The enabling circuit 104 accepts a feedback signal from the regulating circuit 102 along path 119. Such feedback signal is representative of the charge on the energy storage element 106. The enabling circuit compares the charge on energy storage element 106 with a reference charge and may output an enabling signal if the charge level is less than the reference charge level. The enabling circuit 104 may also include various discharging means as further described in reference to FIG. 2 in order to discharge the energy storage element 106 below the reference charge level should the charge be greater than the reference charge level.

In one embodiment, once the charge on the energy storage element 106 is below the reference charge, the enabling circuit 104 sends an enabling signal along path 115 to the controller 120. The controller 120 is responsive to the enabling signal to then enable the regulating circuit to switch from a first state, e.g., a non-operating state or a predetermined suitable operating state, to a second state, e.g., another operating state. As such, an enabling circuit 104 consistent with the invention may advantageously delay operation of the regulating circuit 102 in the second state while maintaining operation of the regulating circuit 102 in the first state until the energy storage element 106 is discharged below a reference charge.

In another embodiment, the enabling circuit 104 may not send an enabling signal to the controller 120 until both the energy storage element 106 is discharged below the reference charge level and a logic control signal, e.g., signal chginh, input to the enabling circuit is at a predetermined state. Such predetermined state is representative of at least one satisfactory non energy storage element condition. Such predetermined state may also be representative of a satisfactory condition for all other non energy storage element conditions. In this case, an enabling circuit 104 consistent with the invention delays switching the regulating circuit 102 to operation in the second state while maintaining operation of the regulating circuit 102 in the first state, e.g., a non-operating state or a predetermined suitable operating state, until the energy storage element 106 is discharged below a predetermined charge level and a signal representing at least one satisfactory non energy storage element condition related to operation of the regulating circuit is satisfied.

Figure 2:
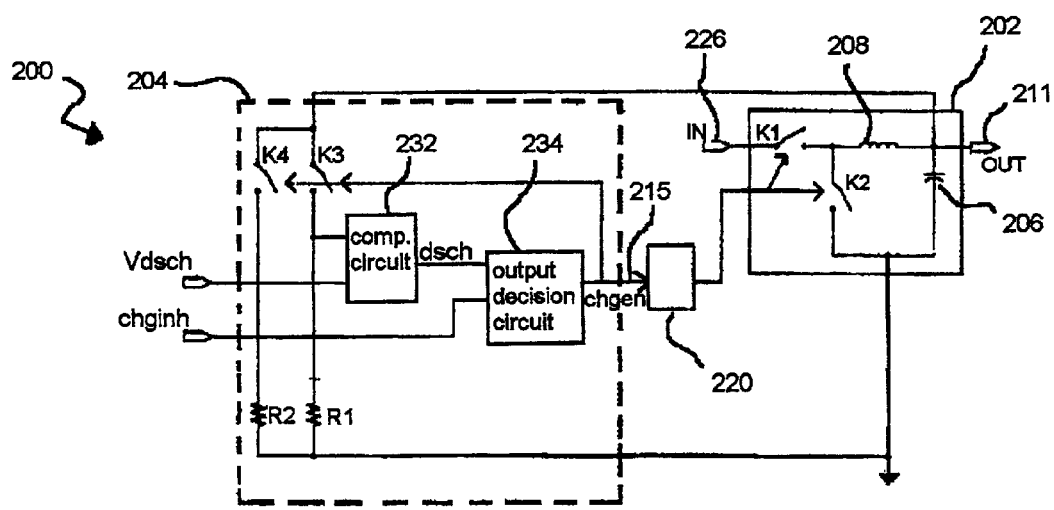
FIG. 2 is a block diagram of an exemplary enabling circuit consistent with the invention for enabling an associated synchronous rectifier converter to switch from one state to another state.

Turning to FIG. 2, one exemplary system 200 having an enabling circuit 204 consistent with the invention and a synchronous rectifier converter (SRC) 202 is illustrated. The SRC accepts an input voltage signal at input terminal 226 and provides an output voltage signal at output terminal 211. The SRC may include an inductor 208, a capacitor 206 and switches K1, K2. Switches K1, K2 may be any type of transistors and for simplicity are drawn to represent MOS type transistors. Such switches K1, K2 may be controlled by a variety of control techniques such as pulse width modulation (PWM) where the switch frequency is constant and the duty cycle varies with load, pulse-frequency modulation, or current-limited pulse-frequency modulation as those control techniques are known to those skilled in the art.

The enabling circuit 204 may include a comparator circuit 232, an output decision circuit 234, and discharge path including resistors R1, R2 and switches K3, K4. The comparator circuit 232 may be any variety of circuits for comparing the charge on the capacitor 206 to a predetermined reference value charge represented by control signal Vdsch input to the comparator circuit. The comparator circuit 232 is configured to provide an output signal to maintain the SRC 202 in the first state, e.g., a non-operating state or a predetermined suitable operating state, if the charge on the capacitor 206 is higher than the reference charge. The comparator circuit 232 is also configured to provide output signal to switch the SRC 202 from the first state to a second state, e.g., another operating state where switches K1, K2 are under control of the controller 220, if the charge on the capacitor 206 is less than the reference charge.

The output decision circuit 234 may be any variety of circuits for performing a desired logic function. The output decision circuit 234 accepts the output signal dsch from the comparator circuit 232 and may further accept a logic signal chginh from a separate source. The output decision circuit 234 may be configured to output an enabling signal on path 215 to the controller 220 if signal dsch indicates the charge on the capacitor 206 is less than a reference charge level.

The output decision circuit 234 may alternately require signal dsch to indicate the charge on the capacitor 206 is less than a reference charge level, and require signal chginh to be in a predetermined state, e.g., low state, when at least one non energy storage element condition is satisfied. The output decision circuit 234 is not a necessary part of the enabling circuit 204 if the logic signal chginh is not input to the enabling circuit. In this case, the comparator circuit 232 would provide the enabling signal if the charge on the capacitor 206 is less than the reference charge.

The enabling circuit 204 may also include a discharge path including resistors R1, R2, and switches K3, K4 to discharge the capacitor 206 below a reference level. Switches K3, K4 may be any type of transistors and for simplicity are drawn to represent MOS type transistors. Detailed operation of an enabling circuit and the discharge path is made later with reference to the exemplary enabling circuit of FIG. 2A.

Figure 2A:
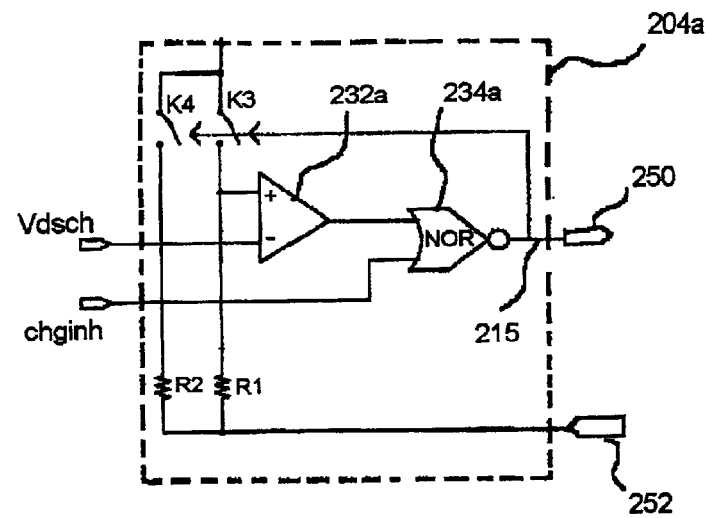
FIG. 2A is a circuit diagram illustrating an exemplary embodiment of the enabling circuit of FIG. 2.

Turning to FIG. 2A, a circuit diagram of one exemplary enabling circuit 204a is illustrated. Those skilled in the art will recognize a variety of circuit configurations which may be utilized in an enabling circuit consistent with the present invention. In the exemplary embodiment of FIG. 2A, the comparator circuit 232 of FIG. 2 includes a comparator 232a having its positive input terminal accepting the input signal representative of the charge on the capacitor 206 and its negative input terminal accepting the other input control signal, Vdsch, representative of a reference value charge.

The output decision circuit 234 includes a NOR gate 234a. The NOR gate 234a accepts the output from the comparator 232a and the control signal chginh. The output of the NOR gate 234a is HIGH only if all inputs are LOW. Otherwise, the output of the NOR gate 234a is LOW. In this embodiment, the enabling signal sent by the enabling circuit 204 to the controller 220 to enable the regulating circuit 202 to switch from the first state, e.g. switches K1, K2 open, to the second state state, e.g., switches K1, K2 under control of controller 220, is sent when the output of the NOR gate is HIGH.

Operation of the exemplary enabling circuit 204a in conjunction with the system 200 is described further herein with reference to the Truth Table of Table 1. Table 1 details the status of the various control signals and switches relative to each other with the output decision circuit 234 functioning as the NOR gate 234a of FIG. 2A. The status of control signal chginh input to the enabling circuit 204, control signal dsch output from comparator 232a, control signal chgen output from the NOR gate 234a, switches K1, K2 of the SRC 202, and switches K3, K4 of the enabling circuit 202 are all detailed in Table 1.

TABLE 1

| chginh | H | H | L | L |
|---|---|---|---|---|
| dsch | H | L | H | L |
| chgen | L | L | L | H |
| K1 | OFF | OFF | OFF | PWM |
| K2 | OFF | OFF | OFF | PWM |
| K3 | ON | ON | ON | OFF |
| K4 | ON | ON | ON | OFF |

As illustrated and described more fully herein, the exemplary enabling circuit 204a advantageously does not enable switches K1, K2 of the SRC 204 to be controlled by the proper control technique, e.g., PWM control, and maintains switches K1, K2 in an OFF position, until the capacitor 206 of the SRC 204 is discharged below a reference charge (control signal dsch is L), and at least one other non capacitor charge related condition for operation of the regulating circuit (control signal chginh is L) is satisfied. As such, negative voltage transients that may otherwise occur at the output terminal 211 of the SRC 204 are avoided.

As illustrated in the first substantive column of Table 1, if the charge level on capacitor 206 is greater than a reference charge level as represented by control signal vdsch input to the comparator 232a, then the control signal dsch output from the comparator 232a is HIGH. The output control signal dsch from the comparator 232a is then input to the NOR gate 234a.

The other input to the NOR gate 234a may be the control signal chginh from a separate source. Such control signal chginh is representative of at least one non capacitor related condition pertinent to operation of the SRC 202. In this embodiment, if this chginh signal is LOW, at least one and perhaps all other non capacitor related conditions pertinent to operation of the SRC 202 are satisfactory. If this chginh signal is HIGH, such condition or conditions are unsatisfactory. Accordingly, if the output control signal dsch from the comparator 232a is HIGH and the chginh signal is also HIGH, the output signal from the NOR gate 344a is LOW. Thus, switches K1 and K2 remain OFF or open and the operation of the SRC 202 is delayed. As such, if the SRC is operating to provide a charging current to an associated rechargeable battery, such charging current would not be provided in this instance, nor would current flow from the capacitor 206 through the inductor 208 be possible in this instance.

Turning to the second substantive column of Table 1, if the capacitor 206 is discharged below the reference charge represented by control signal vdsch, the output control signal dsch from the comparator 232a goes LOW indicating the charge level on the capacitor 206 is acceptable. However, if another non capacitor charge related condition is unsatisfactory, the control signal chginh remains HIGH. As such, the output of the NOR gate 234a remains LOW and the operation of the SRC 202 is still delayed.

Turning to the third substantive column of Table 1, if the control signal chginh is LOW representing a satisfactory starting condition for at least one non-charge related condition, but the output control signal dsch from the comparator 232a is HIGH, then the output signal chgen from the NOR gate 234a remains LOW. As such, the operation of the SRC 202 is still delayed.

As illustrated in the fourth substantive column of Table 1, it is not until the capacitor 206 is discharged below the reference charge level (control signal dsch output from the comparator 232a is LOW), and at least one if not all other non-charge related conditions for operation of the regulating circuit (control signal chginh is LOW) are satisfied, that the control signal chgen output of the NOR gate 234a is HIGH. Once the control signal chgen is HIGH, switches K3 and K4 of the enabling circuit 202 open or are in an OFF position. The HIGH control signal chgen enables the controller 220 to drive the SRC 202. Hence, switches K1, K2 are controlled by an appropriate control technique, e.g., PWM.

If the enabling signal is not present in this embodiment, switches K3, K4 are closed or in an ON position. A discharge path for the capacitor 206 is then created through the switches K3, K4. Switch K3 is further coupled in series to resistor R1, while switch K4 is further coupled in series to resistor R2. Resistor R1 has a resistive value that is higher than the resistive value for resistor R2. As such, when switches K3, K4 are closed because no enabling signal from the NOR gate 234a is present, a discharge path is created and resistor R2 serves to discharge the capacitor 206.

Figure 3:
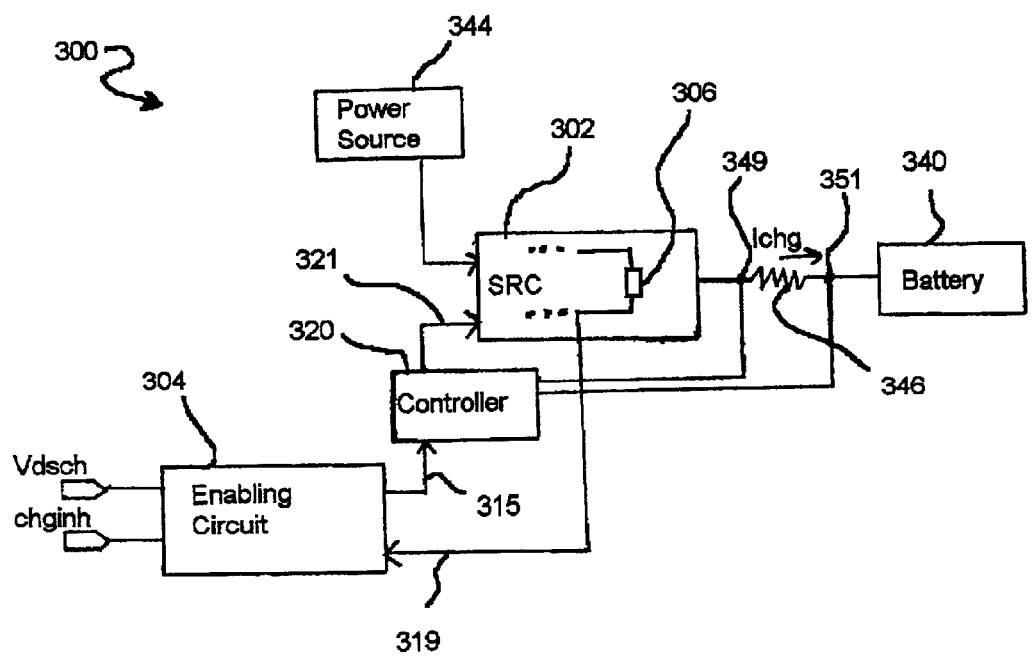
FIG. 3 is a block diagram of a battery management system utilizing the enabling circuit of FIG. 2.

Turning to FIG. 3, an exemplary battery charging system 300 generally including a power source 344, an SRC 302, an enabling circuit 304 consistent with the invention, a rechargeable battery 340, and a battery charging controller 320 is illustrated. Such a battery charging system 300 may be used in a variety of portable electronic devices such as laptop computers, cell phones, pagers, personal digital assistants, and the like to provide and control power flow to a rechargeable battery 340, e.g., a lithium, nickel-cadmium, or nickel-metal hydride battery.

A sensor such as sense resistor 346 may be used in order to provide a sensed signal to the controller 320 indicative of the charging current Ichg to the battery. Such a controller 320 is typically an integrated circuit (IC) and may be sensitive to negative voltage transients that may otherwise occur at either terminal 349, 351 if the energy storage element 306 is not properly discharged below a reference charge value. Such negative voltage transients may appear on either terminal 349, 351 due to oscillation induced by an inductor and capacitor group of the SRC 302.

Once a power source 344 is properly coupled to the system 300, it provides an input DC voltage signal to the SRC 302. The power source 344 may be an AC/DC adapter configured to receive conventional AC voltage from a power outlet and convert it to an applicable DC voltage, or a DC/DC adapter such as a "cigarette lighter" type adapter configured to plug into that type of socket, or other types of power sources.

Advantageously, the SRC 302 accepts power input from the power source 344 and converts it to a proper output voltage and current level for providing a charging current Ichg to the battery 340 only if the controller 320 receives an enabling signal from the enabling circuit 304 along path 315. Otherwise, the controller 320 delays providing a charging current Ichg to the battery 340, while keeping the SRC 302 in a predetermined suitable state. This predetermined suitable state may be any variety of states as determined by the position of various switches in the SRC 302. In the previous embodiment of FIG. 2, switches K1, K2 of SRC 202 were chosen to be in an open state. The SRC 302 is controlled by the controller 320 by any variety of control techniques, e.g., PWM, known by those skilled in the art.

Advantageously therefore, the enabling circuit 304 delays providing of the charging current Ichg to the battery 340 until the energy storage element 306 is discharged below a reference charge. The enabling circuit 304 may also further delay the charging current Ichg to the battery 340 until another control signal, e.g., signal chginh, from another source indicates that at least one non-charge related condition pertinent to operation of the SRC 302 is satisfactory.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An enabling circuit for enabling a synchronous rectifier converter having a capacitor coupled to an output terminal of said synchronous rectifier converter, said enabling circuit comprising:

a comparison circuit configured to compare a feedback signal representative of a charge on said capacitor with a signal representative of a reference charge and provide an output in response to said comparison;

an output decision circuit configured to receive at least said output from said comparison circuit and provide an enabling signal to enable said synchronous rectifier converter to switch from a first state to a second state if said charge on said capacitor is less than said reference charge; and a discharge path coupled to said capacitor and said comparison circuit, wherein said discharge path is configured to discharge said charge on said capacitor if said charge is greater than said reference charge.

2. The enabling circuit of claim 1, wherein said output decision circuit is further configured to receive a condition signal, and wherein said output decision circuit provides said enabling signal in response to said condition signal.

3. The enabling circuit of claim 1, wherein said comparison circuit comprises a comparator.

4. The enabling circuit of claim 1, wherein said output decision circuit comprises a NOR gate.

5. The enabling circuit of claim 1, wherein said discharge path comprises at least one resistor, wherein said at least one resistor is configured to discharge said charge on said capacitor.

6. The circuit of claim 1, wherein said discharge path comprises a first resistor having a first resistive value and a second resistor having a second resistive value, said first resistive value higher than said second resistive value, and said first resistor connected in parallel with said second resistor, wherein said second resistor is configured to discharge said capacitor to a charge level less than said reference charge.

7. The circuit of claim 6, wherein said discharge path further comprises a first switch coupled in series with said first resistor and a second switch coupled in series with said second resistor, wherein said first switch and said second switch are configured to close if said enabling signal is not output from said output decision circuit, and wherein said first switch and said second switch are configured to open if said enabling signal is output from said output decision circuit.

8. The enabling circuit of claim 7, wherein said first switch and said second switch are closed when said synchronous rectifier converter is in said first state and open when said synchronous rectifier converter is in said second state.

9. The enabling circuit of claim 1, wherein said synchronous rectifier converter does not provide a charging current to an associated battery when said synchronous rectifier converter is in said first state and does provide a charging current to said associated battery when said synchronous rectifier converter is in said second state.

10. A battery charging system comprising:

a synchronous rectifier converter configured to accept an input power level from a power source and provide a regulated output power level to a rechargeable battery, said synchronous rectifier converter having a capacitor coupled to an output terminal of said synchronous rectifier converter; and an enabling circuit for enabling said synchronous rectifier converter, said enabling circuit comprising:

a comparison circuit configured to compare a feedback signal representative of a charge on said capacitor with a signal representative of a reference charge and provide an output in response to said comparison; and an output decision circuit configured to receive at least said output from said comparison circuit and provide an enabling signal to enable said synchronous rectifier converter to switch from a first state to a second state if said charge on said capacitor is less than said reference charge; and a discharge path coupled to said capacitor and said comparison circuit, wherein said discharge path is configured to discharge said charge on said capacitor if said charge is greater than said reference charge.

11. The system of claim 10, wherein said output decision circuit is further configured to receive a condition signal, and wherein said output circuit provides said enabling signal in response to said condition signal.

12. The system of claim 10, wherein said comparison circuit comprises a comparator.

13. The system of claim 10, wherein said output decision circuit comprises a NOR gate.

14. The system of claim 10, wherein said discharge path comprises at least one resistor, wherein said at least one resistor is configured to discharge said charge on said capacitor.

15. The system of claim 10, wherein said discharge path comprises a first resistor having a first resistive value and a second resistor having a second resistive value, said first resistive value higher than said second resistive value, and said first resistor connected in parallel with said second resistor, wherein said second resistor is configured to discharge said capacitor to a charge level less than said reference charge.

16. The system of claim 15, wherein said discharge path further comprises a first switch coupled in series with said first resistor and a second switch coupled in series with said second resistor, wherein said first switch and said second switch are configured to close if said enabling signal is not output from said output decision circuit, and wherein said first switch and said second switch are configured to open if said enabling signal is output from said output decision circuit.

17. The system of claim 16, wherein said first switch and said second switch are closed when said synchronous rectifier converter is in said first state and open when said synchronous rectifier converter is in said second state.

18. The system of claim 10, wherein said synchronous rectifier converter does not provide a charging current to said rechargeable battery when said synchronous rectifier converter is in said first state and does provide said charging current to said rechargeable battery when said synchronous rectifier converter is in said second state.

19. A method of avoiding negative voltage transients at the output of a synchronous rectifier converter having a capacitor coupled to an output terminal of said synchronous rectifier converter, said method comprising:

monitoring a charge on said capacitor;

maintaining said synchronous rectifier converter in a first state if said charge is above a reference level;

switching said synchronous rectifier converter to a second state if said charge is below said reference level; and discharging said capacitor via a discharge path of an enabling circuit if said charge is above said reference level.

20. The method of claim 19, wherein said switching step occurs if at least one non capacitor condition is satisfactory.

21. The method of claim 19, wherein said synchronous rectifier converter does not provide a charging current to an associated battery if said synchronous rectifier converter is in said first state, and wherein said synchronous rectifier converter does provide said charging current to said associated battery if said synchronous rectifier converter is in said second state.

22. A method of avoiding negative voltage transients at the output of a synchronous rectifier converter having a capacitor coupled to an output terminal of said synchronous rectifier converter, wherein said synchronous rectifier converter provides a charging current to an associated rechargeable battery, said method comprising the steps of:

monitoring a charge on said capacitor;

maintaining said synchronous rectifier converter in a first state if said charge on said capacitor is above a reference charge;

discharging said capacitor via a discharge path of an enabling circuit until said charge on said capacitor is less than said reference charge; and enabling said charging current to flow to said associated rechargeable battery once said capacitor is discharged to a charge value less than said reference charge.

23. An enabling circuit for enabling a synchronous rectifier converter having a capacitor coupled to an output terminal of said synchronous rectifier converter, said enabling circuit comprising:

a comparison circuit configured to compare a feedback signal representative of a charge of said capacitor with a signal representative of a reference charge and provide an output in response to said comparison to enable said synchronous rectifier converter to switch from a first state to a second state if said charge of said capacitor is less than said reference charge; and a discharge path coupled to said capacitor and said comparison circuit, wherein said discharge path is configured to discharge said charge on said capacitor if said charge is greater than said reference charge.

24. The enabling circuit of claim 23, wherein said discharge path comprises at least one resistor, wherein said at least one resistor is configured to discharge said charge on said capacitor.

25. The enabling circuit of claim 23, wherein said discharge path comprises a first resistor having a first resistive value and a second resistor having a second resistive value, said first resistive value higher than said second resistive value, and said first resistor connected in parallel with said second resistor, wherein said second resistor is configured to discharge said capacitor to a charge level less than said reference charge.

26. The enabling circuit of claim 25, wherein said discharge path further comprises a first switch coupled in series with said first resistor and a second switch coupled in series with said second resistor, wherein said first switch and said second switch are configured to close to discharge said charge on said capacitor if said charge is greater than said reference charge.

27. An enabling circuit for enabling a synchronous rectifier converter having a capacitor coupled to an output terminal of said synchronous rectifier converter, said enabling circuit comprising:

an output decision circuit configured to receive a signal representative of a comparison between a charge on said capacitor and a reference charge level and provide an enabling signal to enable said synchronous rectifier converter to switch from a first state to a second state if said charge of said capacitor is less than said reference charge; and a discharge path coupled to said capacitor, wherein said discharge path is configured to discharge said charge on said capacitor if said charge is greater than said reference charge.

28. The enabling circuit of claim 27, wherein said output decision circuit is further configured to receive a condition signal, and wherein said output circuit provides said enabling signal in response to said condition signal.

29. The enabling circuit of claim 27, wherein said output decision circuit comprises a NOR gate.

30. The enabling circuit of claim 27, wherein said discharge path comprises at least one resistor, wherein said at least one resistor is configured to discharge said charge on said capacitor.

31. The circuit of claim 27, wherein said discharge path comprises a first resistor having a first resistive value and a second resistor having a second resistive value, said first resistive value higher than said second resistive value, and said first resistor connected in parallel with said second resistor, wherein said second resistor is configured to discharge said capacitor to a charge level less than said reference charge.

32. The circuit of claim 31, wherein said discharge path further comprises a first switch coupled in series with said first resistor and a second switch coupled in series with said second resistor, wherein said first switch and said second switch are configured to close if said enabling signal is not output from said output decision circuit, and wherein said first switch and said second switch are configured to open if said enabling signal is output from said output decision circuit.

* * * * *